United States Patent Office

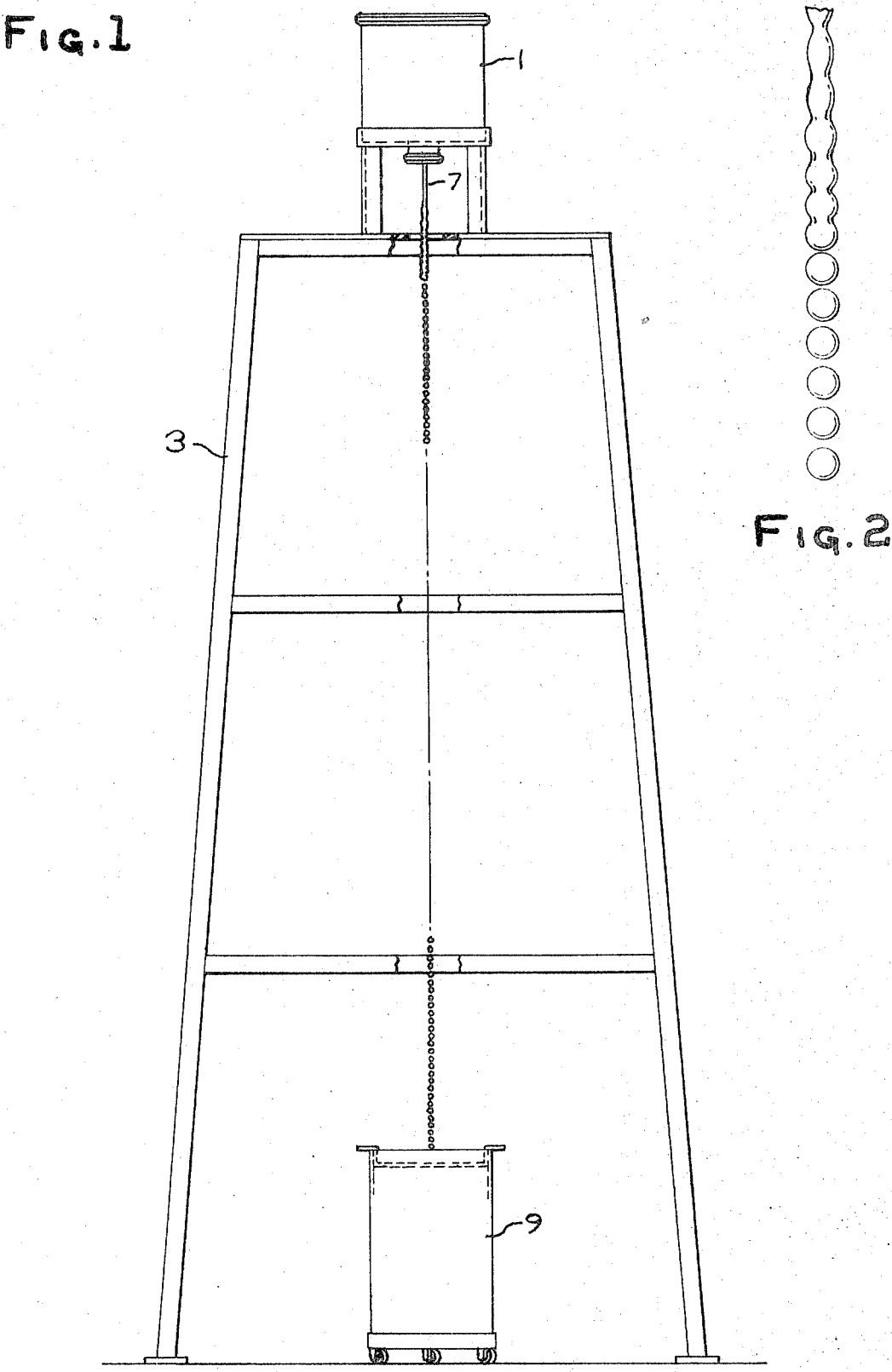

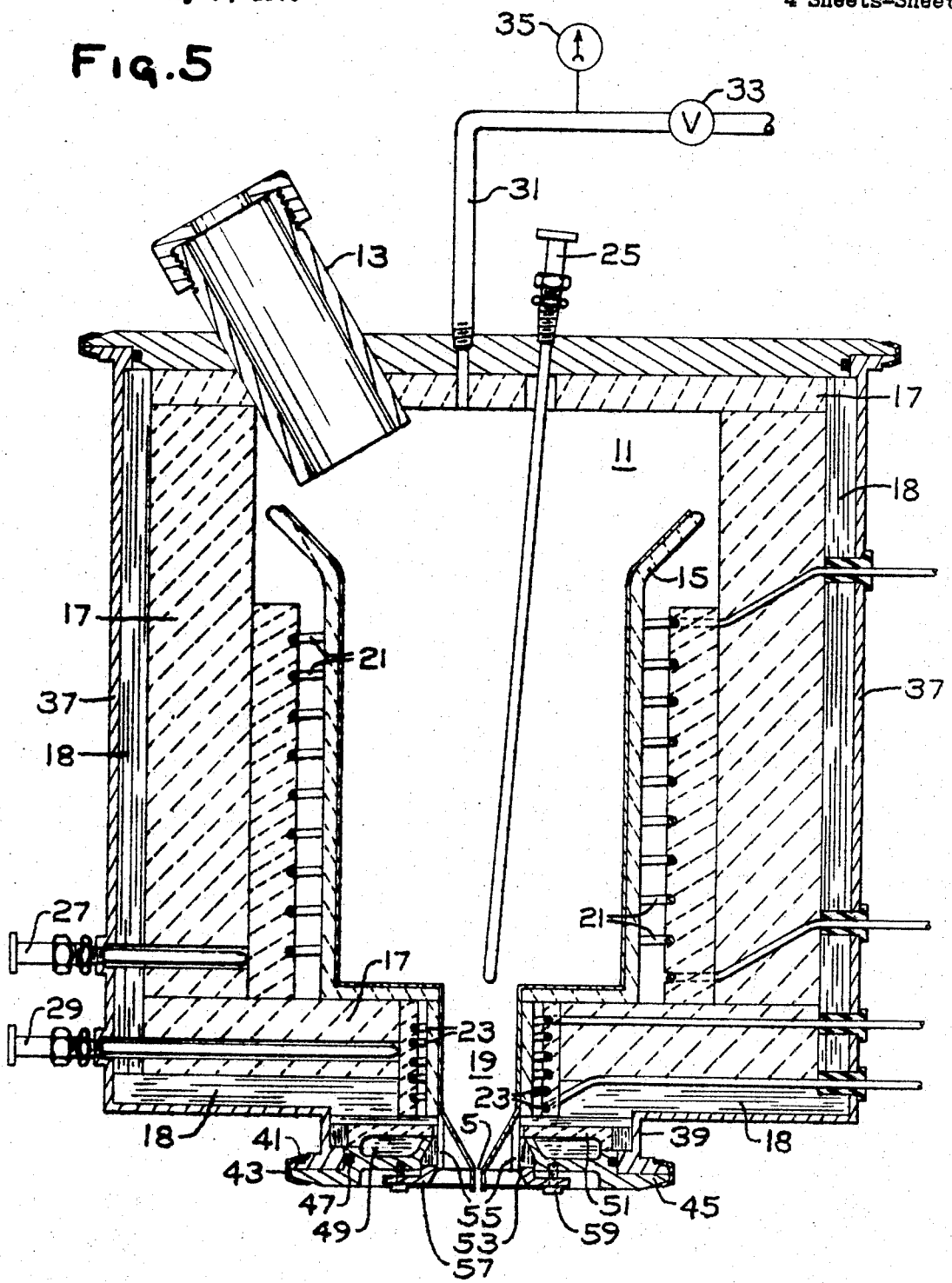

3,843,340
Patented Oct. 22, 1974

---

3,843,340
METHOD AND APPARATUS FOR PRODUCING GLASS BEADS
Eugene J. Cone, Cheswick, Pa., assignor to
PPG Industries, Inc., Pittsburgh, Pa.
Filed May 3, 1973, Ser. No. 356,971
Int. Cl. C03b 19/10
U.S. Cl. 65—21                                    15 Claims

ABSTRACT OF THE DISCLOSURE

A method for producing glass beads by jetting molten glass through a small-diameter orifice is disclosed. Beads of a desired and predetermined particle size can be formed directly from the resultant glass jet without the use of any external force acting on the jet to disperse it into droplets. The beads are made from a low melting glass, preferably phase-separable alkali-borosilicate glass, which can be used to prepare porous glass beads useful as catalyst supports.

BACKGROUND OF THE INVENTION

Field of the Invention

This invention relates to a novel method and apparatus for producing glass beads. More particularly, this invention relates to a method of producing glass beads of a predetermined particle size directly from a glass melt.

Brief Description of the Prior Art

Glass beads have many industrial applications, for example, glass beads are frequently used to provide reflecting surfaces for motion picture screens, highway signs, marking paint, etc. A new and interesting use for glass beads is as a catalyst support. In this latter application, the beads are comprised of a phase-separable alkali-borosilicate glass. The glass, after it has been produced in bead form, can be phase separated and the soluble phase leached out with water and/or acid to yield a porous bead with large surface areas.

Various methods and apparatus have been proposed for commercial production of glass beads. Typical examples of the most pertinent prior art in this area are U.S. Pats. 2,600,963, 2,965,921, 3,150,947, 3,243,273, all to Bland, 3,279,905 to Wood et al., 3,293,014 to Callander et al. and 3,313,608 to Guyer et al.

In U.S. Pat. 2,600,963 to Bland, molten glass is put directly into cold water where it is rapidly cooled to form a frit. The frit is then dried and ground to the desired particle size. The particles are then injected into a burner flame in order to melt the particles and allow surface tension to form them into spheres. Among the disadvantages of such a method is the fact that only very small particles can be formed and due to the dispensing effect of the flame, collection of the beads is difficult. Further disadvantages are the large number of glass filaments formed along with the beads and the lack of economy inherent in forming operations involving the remelting of cooled glass.

U.S. Pat. 2,965,921 to Bland teaches directing a molten stream of glass to fall upon a cold contacting surface whereupon the glass is dispersed into droplets. A stream of air is directed at the point of contact to assist in dispersing the stream and to remove the droplets.

Other prior art processes for the production of glass beads from a molten stream of glass provide for flowing the stream of molten glass into a high velocity gas jet which is substantially transverse to the stream of molten glass whereupon the glass stream is dispersed into droplets. The droplets are then separated from the gas jet and subsequently cooled and collected. Examples of such prior art are U.S. Pats. 3,150,947, 3,243,273, both to Bland, 3,279,905 to Wood et al. and 3,293,014 to Callander et al.

U.S. Pat. 3,313,608 to Guyer et al. offers a variation to the above-discussed prior art in that instead of an impinging gas jet dispersing the molten stream of glass, a magnetic field is applied across the glass stream to disperse it into droplets.

All of the above-discussed prior art has one feature in common, namely, that some force external to the stream of molten glass must be employed to disperse the glass into particle form. As such, the prior art teachings suffer from complexity of design and attending high cost. Also, particle sizes are rather small and the particle size distribution is rather broad, there being no effective way to adjust the process parameters to produce larger beads with a narrow particle size distribution.

It would therefore be desirable to provide a simpler and less expensive method for producing glass beads than those methods taught by the prior art. It would be particularly desirable to provide a method in which larger beads of a predetermined particle size could be formed directly from a molten stream of glass without the need for applying an external dispersing force on the stream such as is typical of the prior art. This invention provides such a method and also an apparatus for practicing the method.

SUMMARY OF THE INVENTION

The method of the invention comprises melting glass batch material to form a low viscosity glass, for example, a glass having a viscosity of less than 100 poises, and preferably about 0.5 to 10 poises. The glass melt is forced through a small-diameter orifice (for example, $\frac{1}{200}$ to $\frac{1}{8}$ of an inch) under a positive pressure (for example 1 to 20 pounds per square inch) to form a glass jet. The jet is directed outwardly from the nozzle where it eventually breaks apart into particles which, under the influence of surface tension, form glass beads having a diameter of approximately twice that of the orifice. The glass beads are then finally cooled to room temperature. Glasses which are useful in the practice of the invention are alkali-borosilicate glasses containing about 30 to 50 percent $SiO_2$, 40 to 55 percent $B_2O_3$, 0 to 15 percent $Na_2O$ and 0 to 4 percent $Al_2O_3$.

BRIEF DESCRIPTION OF THE DRAWING

FIG. 1 is an elevational view of a glass beading apparatus suitable for practicing the method of the invention.

FIG. 2 is a closer view of the glass jet shown in FIG. 1.

FIG. 5. is a cross-sectional view of the glass-making furnace shown in FIG. 1.

DETAILED DESCRIPTION

Figure 3:
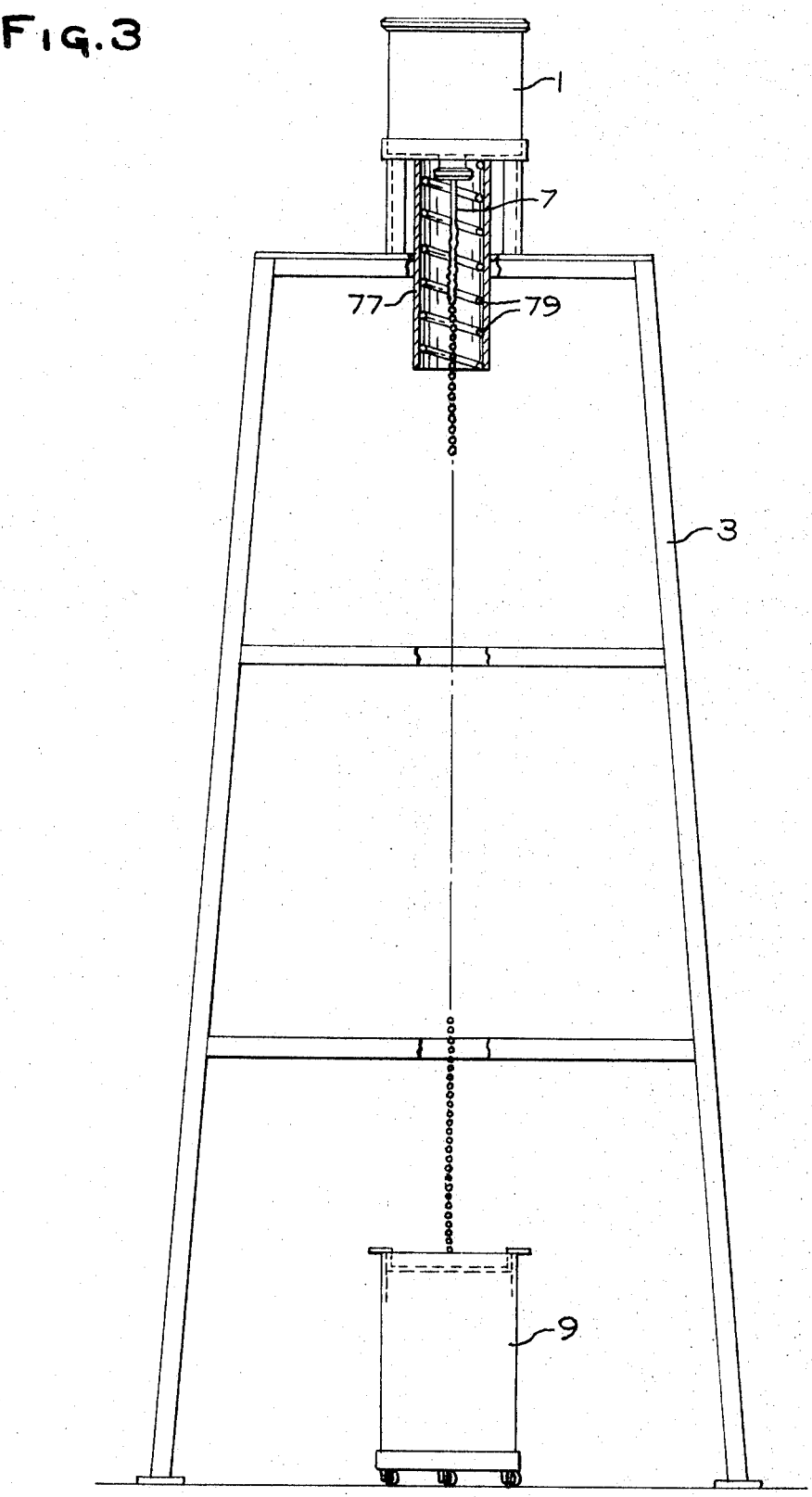
FIG. 3 is an elevational view partially in section showing a glass-making furnace, a glass jet and a cross-sectional view of a heater surrounding the glass jet.

Referring to the figures, a tower 3 supports a glass-making furnace 1 wherein glass batch is melted to a controlled viscosity. The molten glass is forcibly discharged under pressure, preferably 1 to 20 pounds per square inch, through a nozzle orifice 5 to form a fluid jet 7. Preferably, the jet is directed in a substantially downward direction where, due to flow instabilities caused by the surface tension of the molten glass, the jet breaks apart into molten particles which continue to fall under the influence of gravity. Surface tension spherizes the falling molten particles to beads having a diameter about twice that of the nozzle orifice. The beads are initially cooled by falling through the atmosphere and finally cooled by falling into a quenching tank 9 containing a quenchant such as powdered graphite or a silicone oil. By a liquid jet is meant a continuous unbroken stream of molten glass which is emitted under pressure from a small-diameter nozzle orifice and which dissociates into particles which are spherized into beads having a diameter which is related to the diameter of nozzle orifice. For example, in the practice of this invention, the beads have a diameter approximately twice the diameter of the orifice. A je is different from a continuous stream of glass which is not forced through a small-diameter nozzle orifice. Also, the particles formed from an ordinary stream of glass are usually much smaller than the diameter of the orifice through which the glass flows. The particle size distribution of these small particles will be broad and somewhat random having little relation to the size of the orifice.

In the practice of this invention, on the other hand, there is a controlled relationship between the spherical particles which are formed from the glass jet and the diameter of the orifice. When glass of the proper viscosity is discharged through an appropriately sized orifice under controlled pressure conditions, the resultant glass spheres which are formed are approximately twice the diameter of the orifice. By approximately twice the diameter of the orifice is meant that at least 80 percent of the product which is formed will be in bead form having a diameter within the range of 1.75 to 2.25 times the diameter of the nozzle orifice. For example, in discharging molten borosilicate glass having a viscosity of 5 to 10 poises through a 0.0625 inch diameter orifice under a pressure of 1 to 2 pounds per square inch, 90 percent of the product will be beads having a diameter of 0.125 inch±0.030 inch.

The furnace for melting the glass batch can best be seen in the cross-sectional view of FIG. 5. The furnace comprises a steel-jacketed, refractory-lined, cylindrical chamber 11. The glass batch is fed to the furnace through port 13 where it is melted in crucible 15 which is surrounded and supported on refractories 17 and 18. The crucible includes a refractory shell lined with material which will not contaminate the molten glass. Such a material is platinum or molybdenum. A depending neck or nozzle 19 of similar material extends through the bottom of the furnace.

The crucible may be heated in any convenient manner, such as by induction heating or by resistance heating coils, preferably made of molybdenum, shown by 21 and 23 in FIG. 5, and deposited within the refractories.

To control the temperature of the molten glass during its passage through the nozzle 19, separate heating coils 23 are employed. Preferably, the heating current for these coils is independently controllable so that the temperature of the crucible can be controlled by coils 21 and the temperature of the nozzle by coils 23. The heating effect of the several coils may be regulated by means of conventional rheostats or other similar devices not shown. The temperatures of the various portions of the furnace can be monitored by thermocouples 25, 27 and 29 selectively placed throughout the furnace.

The molten glass is discharged from the furnace through the nozzle orifice 5 under pressure. The pressure may be generated either by the hydrostatic head of molten glass within the furnace or by a combination of the hydrostatic head pressure and a positive gas pressure within the chamber 11; the gas being supplied through conduit 31 which is provided with a suitable valve 33 and pressure gauge 35. Pressure may also be developed by the vapor pressure of the molten glass.

When the molten glass is discharged through the nozzle orifices under a positive gas pressure from an external source such as described above, it is necessary that the furnace be tightly sealed to prevent pressure losses. In the nozzle area, sealing is a problem because a platinum or molybdenum nozzle cannot be welded to the steel furnace jacket 37. However, a good seal can be created through the use of refractories and a platinum ring. As is shown in FIG. 5, the steel jacket 37 ends at 39. To this ending is welded a steel member 41 which in turn is attached with a clip 43 to a second steel member 45. An O-ring seal 47 is provided between the members 41 and 45. Supported on member 45 is a yieldable fibrous refractory 49 such as that known under the trade name "Fiberfrax." A nonyielding refractory 51 is supported on the yieldable refractory 49. Another yieldable refractory 53 completes the sealing unit which is held in place by a platinum ring 55 and by steel member 57 which is bolted to the steel member 45 at 59. The unit is sealed by tightening bolts 59 forcing member 57 against the yieldable refractory 53. In its compressed state, yieldable refractory 53. In its compressed state, yieldable refractory 53 forms a tight seal for the pressures employed in this invention.

The glass batch ingredients which are preferred in the practice of this invention are preferably selected from those which can be melted at relatively low temperatures, that is, in relation to soda-lime-silica glass, to form a low viscosity glass melt. Melting temperatures and viscosities which are preferred in the practice of this invention are on the order of 2000 to 2700° F. and less than about 100 poises, more preferably about 0.5 to 10 poises. With low viscosity glasses a jet readily forms at low pressures and dissociates in relatively short distance. Higher viscosity glasses would require higher pressures to form the jet and greater distances for the jet to dissociate. In traveling the greater distances, the higher viscosity glass in the jet would cool more than would a lower viscosity glass which would dissociate from a shorter jet. This greater cooling would harden the glass before surface tension forces could act upon it and would result in the formation of more irregularly shaped particles than those formed from a lower viscosity glass. If higher viscosity glasses are used, the glass jet hould be heated so that the jet will dissociate faster. A suitable heating apparatus is shown in cross section in FIG. 3. A metal-jacketed heater 77 is attached to the bottom of the furnace around the nozzle area. The heater is hollow and open-ended so that the glass jet 7 can pass through the heater and be heated by heating elements 79 which may be resistance wires, Globars or the like.

It is preferred that the low glass viscosity be obtainable at relatively low temperatures. Higher melting glasses, such as soda-lime-silica glasses could, of course, be melted to the desired low viscosities but would require extremely high melting temperatures, on the order of 3100 to 3500° F. Such temperatures are detrimental to the furnace construction and would necessitate the use of more expensive high temperature-resistant materials.

Glasses which can be melted to low viscosities at low temperatures are the borosilicate glasses. Such glasses usually comprise $SiO_2$, $B_2O_3$, alkali metal oxide and, optionally, aluminna, and are described in detail in U.S. patent application Ser. No. 311,191, Dec. 1, 1972, of J. Hammel et al. entitled "Thermally Stable and Crush Resistant Microporous Glass Catalyst Supports and Methods of Making." These glasses contain about 30 to 50 percent by weight, preferably 38 to 46 percent by weight $SiO_2$; 40 to 55, preferably 40 to 52, percent by weight $B_2O_3$; 5 to 15, preferably 8 to 12, percent by weight alkali metal oxide and 0 to 4, preferably 0 to 0.3, percent by weight alumina. The glass batch making ingredients which are melted to form these glasses include glass making sand, boric oxide, alkali metal oxides and alumina. The raw materials should be present in a form which, when mixed and heated, most readily fuse to form a melt. The oxides may be present either in the free state or in the form of other suitable compounds, such as alkali metal carbonates, borates and aluminates. Also, cullet and pellets of an appropriate composition may be used as the whole or part of the feedstock.

After the glass batch ingredients have been suitably melted to form a glass melt, the melt is conducted to the nozzle 19 where glass is discharged through nozzle orifice 5 under a pressure preferably on the order of about 1 to 20 pounds per square inch to form the liquid glass jet.

As mentioned above, the pressure used in forcibly discharging the glass melt through the orifice of the nozzle can be derived solely from the vapor pressure and hydrostatic head pressure of the glass melt or from a combination of the vapor pressure, head pressure and the positive pressure of external gas such as air, carbon dioxide, nitrogen, helium or hydrogen. A positive of external gas can be imposed on the glass melt by introducing the gas into the furnace through conduit 31. The flow of gas into the furnace can be carefully controlled by the use of valve 33 and gauge 35. With such an arrangement, molten glass under accurately controlled temperature and pressure may be supplied continuously to the nozzle 19. The flow of external gas is preferably an inert gas such as nitrogen to protect the molybdenum heating elements from being oxidized at the high temperatures employed. Also, if a molybdenum liner is used in the crucible, a mixture of 5 percent (by volume) hydrogen and 95 percent nitrogen should be used.

The pressure imposed on the glass melt to forcibly discharge it through the orifice of the nozzle should be sufficient that when the pressure is considered with the viscosity of the glass and with the size and design of the orifice, a glass jet will form that when directed in a substantially downward direction will dissociate and form spherical beads which are approximately twice the diameter of the orifice. Accordingly, with appropriately designed and sized orifices and with glass at the appropriate low viscosity, it has been found that pressures of below 50, and preferably about 1 to 20, pounds per square inch (p.s.i.) should be used. Increasing the pressure within this prescribed range will increase the flow rate of the molten glass through the orifice, thereby increasing the production rate. Using lower pressures, that is, lower than 1 pound per square inch, with lower viscosity glasses results in the issuance of discontinuous drips from the nozzle rather than the formation of a continuous flowing glass jet. Besides pressure, the flow rate will also depend on the size of the nozzle orifice. With the pressures employed in this invention, flow rates of from 0.5 to 120 pounds of glass per hour through an orifice can be achieved. With smaller diameter orifices, that is, those having a diameter of 0.002 to 0.009 inch, flows from about 0.5 to 3 pounds per hour depending on the pressure and viscosity of the glass can be achieved. With larger diameter orifices, that is, those on the order of 0.055 to 0.070 inch, flow rates of about 10 to 35 pounds per hour can be realized. With even larger diameter orifices, that is, those having a diameter of about 0.10 to 0.150 inch, flow rates of about 80 to 120 pounds per hour can be achieved.

The nozzle orifice through which the molten glass is discharged should be appropriately sized and designed for the formation of a glass jet. The nozzle orifice should have a relatively small cross-sectional diameter, that is, on the order of 0.002 to 0.150 inch. Smaller cross sections result in difficulty to forcibly discharge the molten glass through such a small orifice. If small-diameter orifices are used, that is, those having a diameter of 0.002 to 0.009 inch, the nozzle orifice should be designed so that the pressure drop across the nozzle orifice will be minimal. For example, the ratio of the height or depth of the orifice to the diameter of the orifice should be minimized to provide a low pressure drop. Larger orifices than that specified above, that is, those having a cross-sectional diameter much greater than ⅛ inch, may not result in the formation of a glass jet but rather in a stream of glass which is not in the form of a jet which will dissociate and form spherical particles in the desired size range. The stream which issues from such a large orifice will fall a longer distance before it dissociates than a jet will fall, and when the stream finally does dissociate, the particles will probably be smaller than the orifice and irregularly shaped, with no precise relation between the size of the particles which are formed and the size of the orifice.

After the molten glass has been forcibly discharged under pressure through the orifice of a nozzle, the resultant glass jet is directed, preferably, in a substantially downward direction. Due to surface tension forces, the jet becomes increasingly unstable the further it falls. This can be seen in detail in FIG. 2. As the glass is jetted out of the furnace, the fluid jet begins to undulate. The undulations increase in amplitude until eventually the jet dissociates into molten particles which continue to fall during which time they are spherized due to surface tension forces. During the time particles are falling, they are of course cooled, but the particles are of a sufficiently low viscosity that surface tension can still spherize them as the particles are falling.

The glass jet is directed outwardly from the orifice. Although it is preferred that the jet be directed in a substantially downward direction, it should be clear that the jet can be directed outwardly from the orifice in most any direction. For example, the jet can be directed in a direction horizontal to the ground or even in a slightly upward direction so that the glass jet and the dissociated particles follow a substantially parabolic path.

Final cooling takes place by discharging the particles into the quenching bath 9. The quenching bath can be a reservoir of cooling liquid such as a silicone oil or can be powdered graphite.

It is preferred that the beads which are collected in the quenching bath be spherical. Surface tension will spherize the beads as they are falling, but the beads will have a tendency to flatten when they impact the quenching bath. These somewhat flattened beads, although not true spheres, are still useful products and are meant to be included within the concept of this invention. Therefore, by beads is meant a regularly shaped particle with a continuous rounded or curved surface. Thus, beads which are slightly out of round, being saucer-shaped and elliptic, are included within the concept of this invention. Also, where the diameter of the beads is mentioned with beads which are slightly out of round, the diameter is taken to mean the major or longest axis passing through the center of the bead.

Figure 4:
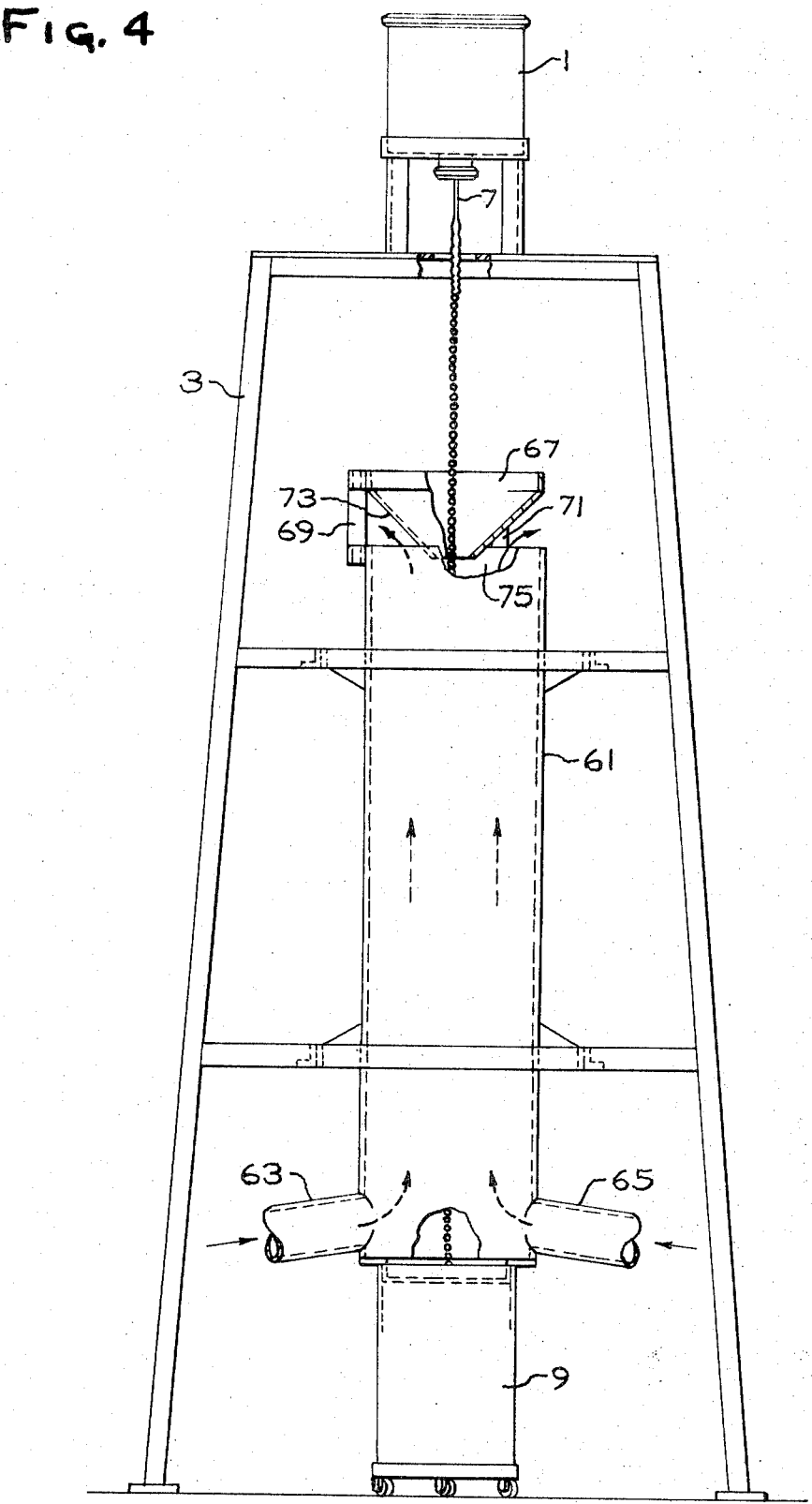
FIG. 4 is an elevational view partially in section of an alternate apparatus for practicing the method of the invention. The apparatus of FIG. 4 includes a cooling tower through which molten glass particles fall.

To collect spherical beads in the quenching bath, the spherical beads should be of the proper hardness when they enter the quenching bath so that they will not flatten on impacting the liquid quenchant. Accordingly, the height of the fall should be carefully adjusted so that the beads will enter the quenching bath at a low enough velocity so that they will not flatten on impacting the liquid quenchant. Also the falling beads can be cooled to a sufficient hardness so that flattening will not occur even when the beads impact the bath at higher velocities. Additional cooling can be provided by directing the downward flight of the particles through a countercurrent flow of cooling gas such as air or carbon dioxide. This can be accomplished, as shown in FIG. 4, by positioning a conduit or stack 61 over the quenchant tank 9. The stack, secured to the tower 3, leads upward from the quenchant tank 9 to an area immediately below the end of the glass jet. The particles which dissociate from the jet are directed into the conduit where they meet a countercurrent flow of cooling gas which is fed into the conduit through ducts 63 and 65. The cooling gas can be air or carbon dioxide. Carbon dioxide has the additional advantages of having a greater heat transfer coefficient and of providing a flame-inhibiting atmosphere for the quenchant bath. When the hot spheres of glass contact the quenching bath, there is a tendency for the quenchant to flame. This is particularly so with certain silicone quenching agents, however, feeding carbon dioxide into the stack 61 significantly minimizes the dangers of fire.

When using an arrangement such as shown in FIG. 4, it is important that the countercurrent flow of cooling gas does not cool the nozzle of the furnace. When this happens, the molten glass may freeze in the nozzle and plug the furnace. To avoid this, the countercurrent flow of cooling gas should be diverted from the nozzle area. A suitable device is a funnel arrangement shown at the top of the stack in FIG. 4. The funnel 67 is positioned immediately below the glass jet and secured to rods, two of which 69 and 71 are shown in the drawing. The rods are spaced about 120° apart and are affixed to the top of the stack 61. After the glass jet dissociates into particles, the particles fall through the center of the funnel into the stack 61 where they meet the countercurrent flow of cooling gas. The countercurrent flow of cooling gas is diverted away from the glass jet and outwardly through the rods by the inclined sides 73 and 75 of the funnel. In this manner, the countercurrent flow of cooling gas mainly serves to cool dissociated glass particles and is diverted away from the glass jet and from the nozzle area of the furnace.

EXAMPLE

To the furnace support on a 20-foot tower such as generally shown in FIGS. 1 to 3, and described above, was charged through port 13 about 33 pounds of glass cullet having the following composition: $SiO_2$, 41.03 percent; $B_2O_3$, 50.42 percent; $Na_2O$, 8.43 percent; and $Al_2O_3$, 0.12 percent. After charging, the port 13 was sealed, and the cullet was heated slowly for about 24 hours to a temperature of about 2560° F. Heating was conducted under a nitrogen atmosphere. At the end of this time, the viscosity of the glass in the furnace was about 7 poises. The glass did not immediately flow out of the furnace because it was frozen in the neck area. To free the glass, the neck heaters were activated to melt the glass in this area and the nitrogen pressure in the furnace was increased to 2 pounds per square inch. The molten glass began to flow through the orifice. The pressure on the glass as it was forcibly discharged through the nozzle was due principally to the nitrogen and hydrostatic head pressure of the glass. The height of the glass in the furnace was about 8 to 9 inches at the beginning of the run and the head pressure would therefore be about ¾ pound per square inch. The flow of nitrogen gas was carefully monitored so as to maintain a nitrogen pressure on the glass of about 2 pounds per square inch. The nozzle orifice had a cross-sectional diameter of about 1/16 of an inch and a design as shown in FIG. 5. As the glass was forcibly discharged through this orifice at a rate of approximately 15 to 16 pounds of glass per hour, it formed a glass jet of approximately 4 feet in length, after which time the jet dissociated into particles which were directed in a downward course until they contracted a silicone quenching oil (General Electric Silicone Fluid SF 96(50)). The particles spherized in their downward fall and contacted the quenching oil as hot spheres. The length of the fall of the particles from the tip of the orifice to the quenching bath was about 16 feet.

It took about 1.75 hours to empty the tank of glass forming about 26.7 pounds of product glass beads. The beads were screened and about 95 percent of the beads were found to be in the form of slightly flattened beads, the rest being mainly in the form of strands, irregularly shaped beads with tails. The product beads which were formed had the following screen analysis (U.S. standard sieve):

|  | Percent |
|---|---|
| −10 mesh | 1.5 |
| +10 mesh | 5.6 |
| +8 mesh | 32.1 |
| +7 mesh | 41.8 |
| +6 mesh | 16.1 |
| +5 mesh | 2.7 |

What is claimed is:
1. A method of forming glass beads comprising:
    (a) melting a glass batch in a furnace to form a glass melt having a viscosity less than 100 poises,
    (b) conducting the glass melt to a nozzle area in said furnace,
    (c) forcibly discharging the glass melt through a small-diameter orifice having a diameter of 0.002 to 0.125 inch in said nozzle under a pressure of 1 to 20 pounds per square inch to form a glass jet,
    (d) directing the glass jet outwardly from said orifice whereby the glass jet breaks apart into particles due solely to flow instabilities of the glass jet, and said particles, under the influence of surface tension, form glass beads having a diameter of approximately twice that of said orifice, and
    (e) cooling said glass beads to room temperature.
2. The method of Claim 1 in which the glass melt has a viscosity of 0.5 to 10 poises.
3. The method of Claim 1 in which the glass has the following composition expressed as percentage by weight on the oxide basis:

(a) $SiO_2$, 30 to 50 percent;
    (b) $B_2O_3$, 40 to 55 percent;
    (c) $Na_2O$, 5 to 15 percent; and
    (d) $Al_2O_3$, 0 to 4 percent.

4. The method of Claim 1 in which the positive pressure is due to the hydrostatic head pressure and the vapor pressure of the glass.
5. The method of Claim 1 in which the positive pressure is imposed at least in part by an inert gas.
6. The method of Claim 1 in which the molten glass is discharged through the orifice at a rate between 15 to 30 pounds per hour.
7. The method of Claim 1 in which the molten glass particles are directed into a stream of cooling gas flowing countercurrent to said molten glass particles.
8. The method of Claim 7 in which the cooling gas is air or carbon dioxide.
9. An apparatus for producing glass beads comprising:
    (a) a furnace with a nozzle orifice having a diameter of from 0.002 to 0.125 inch in diameter through which the molten glass is forcibly discharged under pressure to form a glass jet,
    (b) preliminary cooling means located adjacent said glass jet for cooling molten particles which dissociate from said glass jet for cooling molten particles which dissociate from said glass jet, said preliminary cooling means comprising an open-ended stack located adjacent said glass jet being adapted to encompass molten glass particles which dissociate from said glass jet, and
    (c) final cooling means located adjacent said preliminary cooling means.
10. The apparatus of Claim 9 which further includes a heater for said glass jet.
11. The apparatus of Claim 9 in which the preliminary cooling means is an open-ended stack which is adapted to encompass the molten particles which dissociate from said glass jet and in which there is a stream of cooling gas flowing countercurrent to the molten particles which dissociate from said glass jet.
12. The apparatus of Claim 9 in which the final cooling means is a reservoir of a quenching liquid.
13. The apparatus of Claim 9 in which the final cooling means is a reservoir of powdered graphite.
14. The apparatus of Claim 10 in which the heater surrounds the glass jet.

15. The apparatus of Claim 11 in which the cooling gas is air or carbon dioxide.

References Cited

UNITED STATES PATENTS

| | | | |
|---|---|---|---|
| 2,908,036 | 10/1959 | Russell | 65—12 |
| 3,148,045 | 9/1964 | Schott | 65—21 |
| 3,744,983 | 7/1973 | Jenkins | 65—21 |
| 3,764,403 | 10/1973 | Neeley | 65—114 X |
| 3,625,025 | 12/1971 | Jensen | 65—2 |

OBERT L. LINDSAY, JR. Primary Examiner

U.S. Cl. X.R.

65—142; 264—27

UNITED STATES PATENT OFFICE
CERTIFICATE OF CORRECTION

Patent No. 3,843,340     Dated October 22, 1974

Inventor(s) Eugene J. Cone

It is certified that error appears in the above-identified patent and that said Letters Patent are hereby corrected as shown below:

Column 3, line 11 after "A" "je" should be --jet--.

Column 4, line 28 "distance" should be --distances--.

Column 4, line 38 "hould" should be --should--.

Column 4, line 56 "aluminna" should be --alumina--.

Column 4, line 57 after "311,191" insert --filed--.

Column 5, line 12 after "positive" insert --pressure--.

Column 7, line 25 "support" should be --supported--.

Claim 9, line 8, after "jet" cancel "for cooling molten particles which".

Claim 9, line 9, cancel "dissociate from said glass jet".

Signed and sealed this 31st day of December 1974.

(SEAL)
Attest:

McCOY M. GIBSON JR.                     C. MARSHALL DANN
Attesting Officer                       Commissioner of Patents